Sept. 2, 1924.
J. T. DREYER
ENDLESS TRACK FOR VEHICLES
Filed Nov. 8, 1923
1,507,458
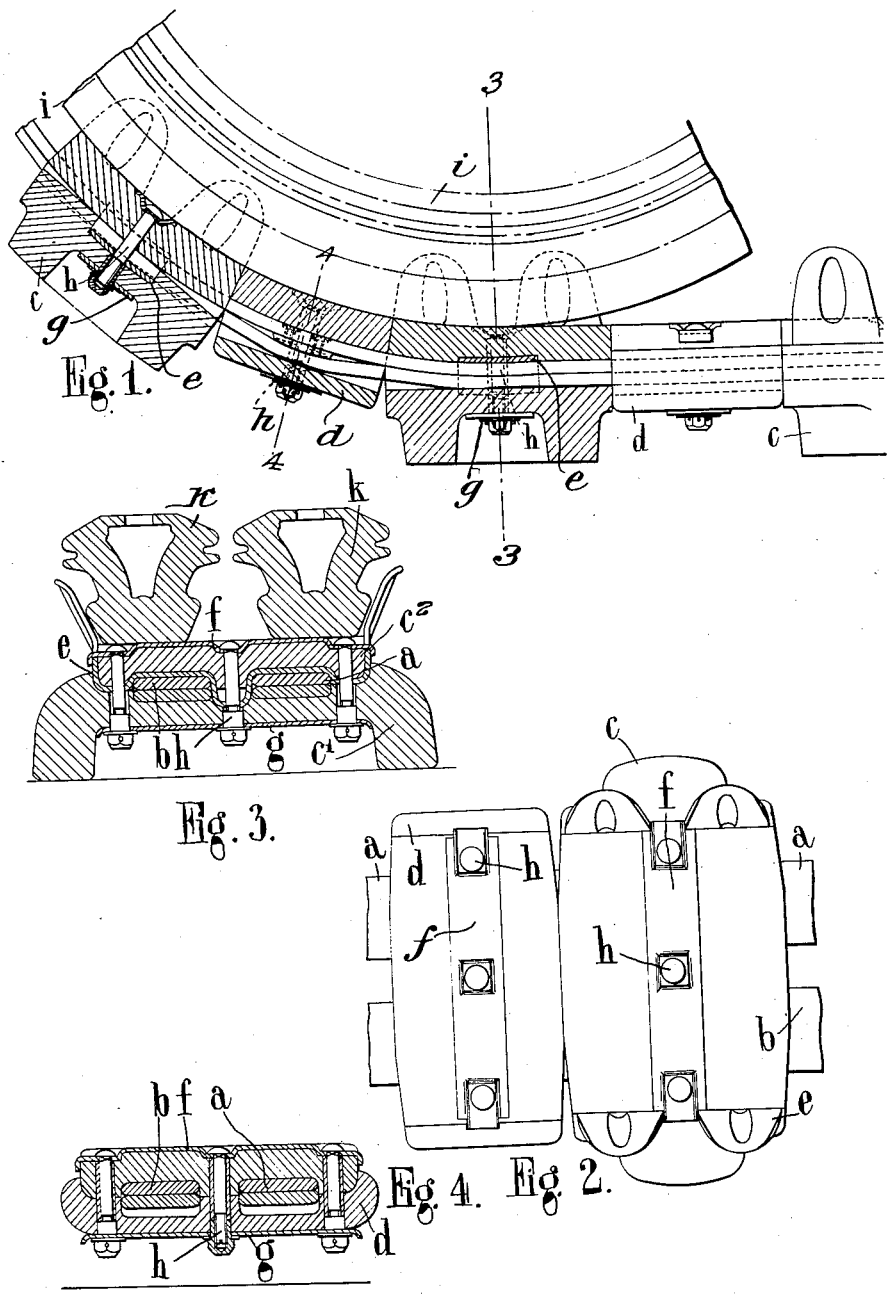
Inventor
J. T. Dreyer
By Marks & Clerk
Attys.

Patented Sept. 2, 1924.

1,507,458

UNITED STATES PATENT OFFICE.

JOHN TUTHILL DREYER, OF LONDON, ENGLAND, ASSIGNOR TO THE VARIABLE SPEED GEAR LIMITED, OF LONDON, ENGLAND.

ENDLESS TRACK FOR VEHICLES.

Application filed November 8, 1923. Serial No. 673,561.

*To all whom it may concern:*

Be it known that I, JOHN TUTHILL DREYER, a British subject, and residing at War Office Buildings, Whitehall, London, S. W. 1., England, have invented certain new and useful Improvements in Endless Tracks for Vehicles, of which the following is a specification.

This invention relates to endless tracks for self-propelled or other vehicles of the type comprising one or more endless belts, bands, wire or other ropes or the like (hereinafter generically referred to as endless member) having a plurality of shoes or plates mounted thereon and adapted to be driven by means of one or more wheels, it being understood that by endless is meant either a member formed without ends or one in which the ends are joined together by suitable means.

One of the principal difficulties that have hitherto been met with in tracks of the above nature is that of securing a sufficiently strong endless member as this is very liable to be torn or tensioned to breaking point by the drag thereon of the shoes when the latter meet with any obstruction sufficient to impede the progress of the vehicle.

The object of the present invention is to overcome the above difficulty by so arranging the shoes in relation to the endless member that the latter will never be unduly stressed and this is achieved by mounting the shoes either loosely upon the endless member or by a frictional grip thereon whereby it results that in the event of any obstruction being encountered relative movement will be permitted between the shoes and the endless member and any undue tension on the latter will be avoided.

The accompanying drawings illustrate one mode of carrying out the invention:—

Figure 1 is a fragmentary view showing in side elevation one form of track in accordance with the invention;

Figure 2 is a plan, and

Figures 3 and 4 are transverse sectional elevations taken on lines 3—3 and 4—4 respectivey of Figure 1.

In carrying my invention into effect in one convenient manner, I form my improved track from any suitable number of endless flexible members on which the shoes or other like devices are freely mounted.

In the particular example illustrated, I have employed two duplex belts $a$, $b$, on which the shoes $c$ are mounted, the shoes being separated by smaller members or distance-pieces $d$ which provide gaps between adjacent shoes to prevent the track slipping on soft ground.

The shoes and distance-pieces are slidably mounted upon the belts or bands so that in this manner the shoes act substantially as sleepers on which the vehicle travels while the belts or the like act merely as guiding members for the shoes, and driving tension upon such belts or bands is eliminated or practically so.

The shoes and distance-pieces may be of any suitable form but in the drawing I have shown each shoe as consisting of a hard rubber member $c'$ separated from a second hard rubber member $c^2$ by a metal plate $e$, the whole being held together between the metal plates $f$ and $g$ by the through bolts $h$. The distance-pieces $d$ may be similarly formed, the construction of those shown in the drawings being clearly illustrated so that further description is unnecessary.

The endless track so formed is adapted to be driven by the wheel member $i$ which in the construction illustrated is formed after the manner of an ordinary road wheel of a motor vehicle with single or twin solid or other tires $k$ and the drive is effected by frictional contact between the surface of such wheel member and the shoes or slippers.

Other methods of mounting the shoes may be adopted in order to secure the same frictionally or otherwise upon the endless members and other methods of securing the friction drive may be employed. For example, the laminated construction of shoe above described may be adopted so that the act of bolting the parts together will also clamp the shoe upon the endless member. In order to prevent friction and wear between the extremities of the holes in the shoe and the endless member, the holes may be flared out at their ends or otherwise suitably formed.

From the foregoing it is believed that the construction, operation and advantages of the invention may be readily understood and it is apparent that changes may be made in the details disclosed without departing from the spirit of the invention as expressed in the claims.

Claims:

1. An endless track for vehicles comprising an endless flexible member and a plurality of shoes loosely mounted thereon for longitudinal movement.

2. An endless track for vehicles comprising an endless flexible member and a plurality of shoes mounted for longitudinal movement and frictionally gripped thereon.

3. An endless track for vehicles comprising an endless flexible member and a plurality of track members movably mounted thereon for longitudinal movement and abutting against one another so as to occupy the whole length of the endless flexible member.

4. An endless track for vehicles comprising an endless flexible member, a plurality of shoes movably mounted thereon for longitudinal movement and spaced apart from one another and a plurality of distance pieces on said endless member occupying the space between successive shoes.

5. An endless track for vehicles comprising an endless flexible member, a plurality of shoes mounted thereon, distance pieces between adjacent shoes forming gaps between the outer projecting ends of the shoes and means for driving the track by a frictional drive on the inner surface of the shoes and distance pieces, said shoes and distance pieces being movable longitudinally along said members.

6. In endless tracks for vehicles, an endless band, shoes slidable longitudinally along said band, and distance pieces between said shoes also slidable longitudinally along said band.

In testimony whereof I have signed my name to this specification.

JOHN TUTHILL DREYER.